United States Patent
Kim et al.

(10) Patent No.: US 11,335,506 B2
(45) Date of Patent: May 17, 2022

(54) CERAMIC ELECTRONIC COMPONENT

(71) Applicant: SAMSUNG ELECTRO-MECHANICS CO., LTD., Suwon-Si (KR)

(72) Inventors: Dong Yeong Kim, Suwon-Si (KR); Dong Hwi Shin, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 32 days.

(21) Appl. No.: 16/197,340

(22) Filed: Nov. 20, 2018

(65) Prior Publication Data

US 2020/0111615 A1    Apr. 9, 2020

(30) Foreign Application Priority Data

Oct. 5, 2018    (KR) .................. 10-2018-0118954

(51) Int. Cl.
*H01G 4/30* (2006.01)
*H01G 4/12* (2006.01)
(Continued)

(52) U.S. Cl.
CPC .............. *H01G 4/30* (2013.01); *H01G 4/008* (2013.01); *H01G 4/12* (2013.01); *H01G 4/232* (2013.01)

(58) Field of Classification Search
CPC .......... H01G 4/232; H01G 4/228; H01G 4/30; H01G 4/248; H01G 4/008; H01G 4/12; H01G 2/02; H01G 4/012; H01G 4/1218
(Continued)

(56) References Cited

U.S. PATENT DOCUMENTS

2009/0310277 A1* 12/2009 Kayatani ............... H01G 4/005
                                                              361/306.3
2010/0119816 A1*  5/2010 Shimokawa .......... C09J 11/04
                                                                428/324
(Continued)

FOREIGN PATENT DOCUMENTS

JP    2003-234242 A    8/2003
JP    2014-135463 A    7/2014
(Continued)

OTHER PUBLICATIONS

Notice of Office Action dated Nov. 20, 2019 in Korean Patent Application No. 10-2018-0118954 (English Translation).

*Primary Examiner* — Arun Ramaswamy
(74) *Attorney, Agent, or Firm* — Morgan, Lewis & Bockius LLP

(57) ABSTRACT

A ceramic electronic component includes a body including a capacitance formation portion including a dielectric layer and a plurality of internal electrodes disposed to face each other with the dielectric layer interposed therebetween and forming capacitance and protective portions disposed on upper and lower surfaces of the capacitance formation portion and external electrodes including electrode layers disposed on the body and connected to the plurality of internal electrodes and conductive resin layers respectively disposed on the electrode layers, wherein ta2/ta1 is 0.05 or greater, where ta1 is the thickness of the electrode layer at a central portion of the capacitance formation portion and ta2 is the thickness of the electrode layer at a boundary between the capacitance formation portion and the protective portion.

12 Claims, 5 Drawing Sheets

(51) Int. Cl.
*H01G 4/008* (2006.01)
*H01G 4/232* (2006.01)

(58) Field of Classification Search
USPC .......... 361/306.1, 306.3, 321.1, 321.3, 301.4
See application file for complete search history.

(56) References Cited

U.S. PATENT DOCUMENTS

| | | | |
|---|---|---|---|
| 2013/0242457 A1* | 9/2013 | Lee | H01G 4/2325 |
| | | | 361/301.4 |
| 2014/0192453 A1 | 7/2014 | Hong et al. | |
| 2017/0271083 A1* | 9/2017 | Makino | H01G 4/30 |
| 2017/0287640 A1 | 10/2017 | Choi et al. | |

FOREIGN PATENT DOCUMENTS

| | | | |
|---|---|---|---|
| JP | 2014-220324 A | 11/2014 | |
| KR | 10-2017-0114138 A | 10/2017 | |
| KR | 10-2017-0121105 A | 11/2017 | |

* cited by examiner (a)

(b)

'K2'

'K3'

CERAMIC ELECTRONIC COMPONENT

CROSS-REFERENCE TO RELATED APPLICATION

This application claims the benefit of priority to Korean Patent Application No. 10-2018-0118954 filed on Oct. 5, 2018, in the Korean Intellectual Property Office, the disclosure of which is incorporated herein by reference in its entirety.

TECHNICAL FIELD

The present disclosure relates to a ceramic electronic component.

BACKGROUND

A multilayer ceramic capacitor (MLCC), a ceramic electronic component, is a chip type condenser mounted on the printed circuit boards (PCB) of various electronic products including display devices such as a liquid crystal display (LCD), a plasma display panel (PDP), and the like, computers, smartphones, cellular phones, and the like, serving to charge or discharge electricity.

Such an MLCC, having advantages such as compactness, guaranteed high capacitance, and ease in the mounting thereof, may be used as a component of various electronic devices. As various electronic devices such as computers, mobile devices, and the like, have become smaller and higher in power output, demand for miniaturization and higher capacity in multilayer ceramic capacitors is increasing.

In addition, as industrial interest in electric parts has recently increased, MLCCs are also being required to have high reliability characteristics in order to be used in automobile or infotainment systems.

Meanwhile, in order to form external electrodes of an MLCC, a method of dipping an exposed surface of a capacitor body to which internal electrodes are exposed, into paste containing a conductive metal, is mainly used.

However, corner portions of the external electrodes formed by the dipping method may be excessively thin. This causes a problem in that, when a plating layer is formed on the external electrodes to increase connectivity and mountability of the MLCC, a plating solution may penetrate into the inside of the capacitor body resulting in reduced reliability of the MLCC.

In addition, a movement path of current is reduced to increase a risk of equivalent series resistance (ESR) failure.

SUMMARY

An aspect of the present disclosure may provide a ceramic electronic component having excellent reliability.

According to an aspect of the present disclosure, a ceramic electronic component may include: a body including a capacitance formation portion including a dielectric layer and a plurality of internal electrodes disposed to face each other with the dielectric layer interposed therebetween and forming capacitance, and protective portions disposed on upper and lower surfaces of the capacitance formation portion; and external electrodes including electrode layers disposed on the body and connected to the plurality of internal electrodes and conductive resin layers respectively disposed on the electrode layers, wherein ta2/ta1 is 0.05 or greater, where ta1 is a thickness of each of the electrode layers at a central portion of the capacitance formation portion and ta2 is a thickness of each of the electrode layers at a boundary between the capacitance formation portion and the protective portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
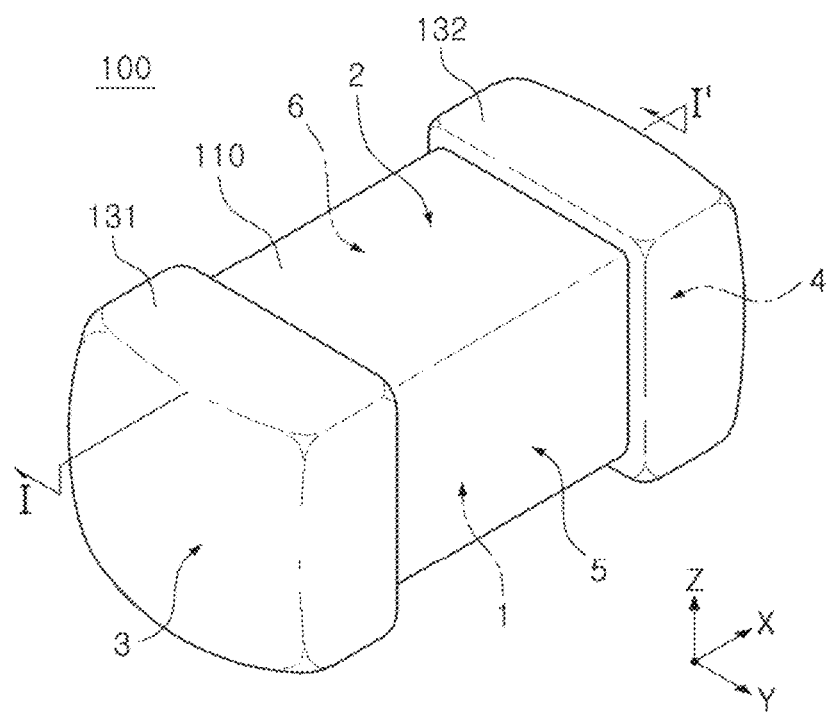
FIG. 1 is a schematic perspective view of a ceramic electronic component according to an exemplary embodiment in the present disclosure.

Hereinafter, exemplary embodiments in the present disclosure will be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. In addition, a vertical direction refers to the abovementioned upward and downward directions, and a horizontal direction refers to a direction perpendicular to the abovementioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Ceramic Electronic Component

FIG. 1 is a schematic perspective view of a ceramic electronic component according to an exemplary embodiment in the present disclosure.

Figure 2:
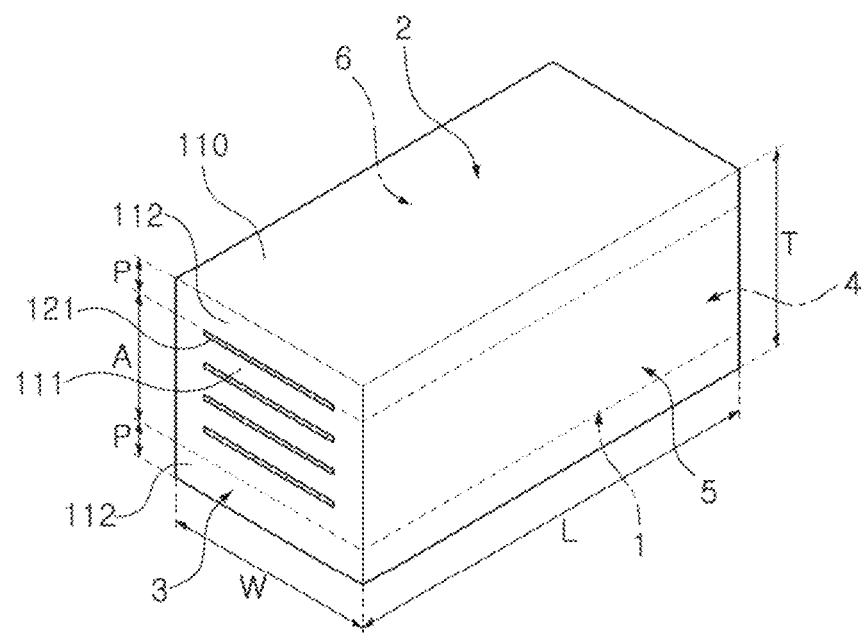
FIG. 2 is a schematic perspective view of a body according to an exemplary embodiment in the present disclosure.

FIG. 2 is a schematic perspective view of a body according to an exemplary embodiment in the present disclosure.

Figure 3:
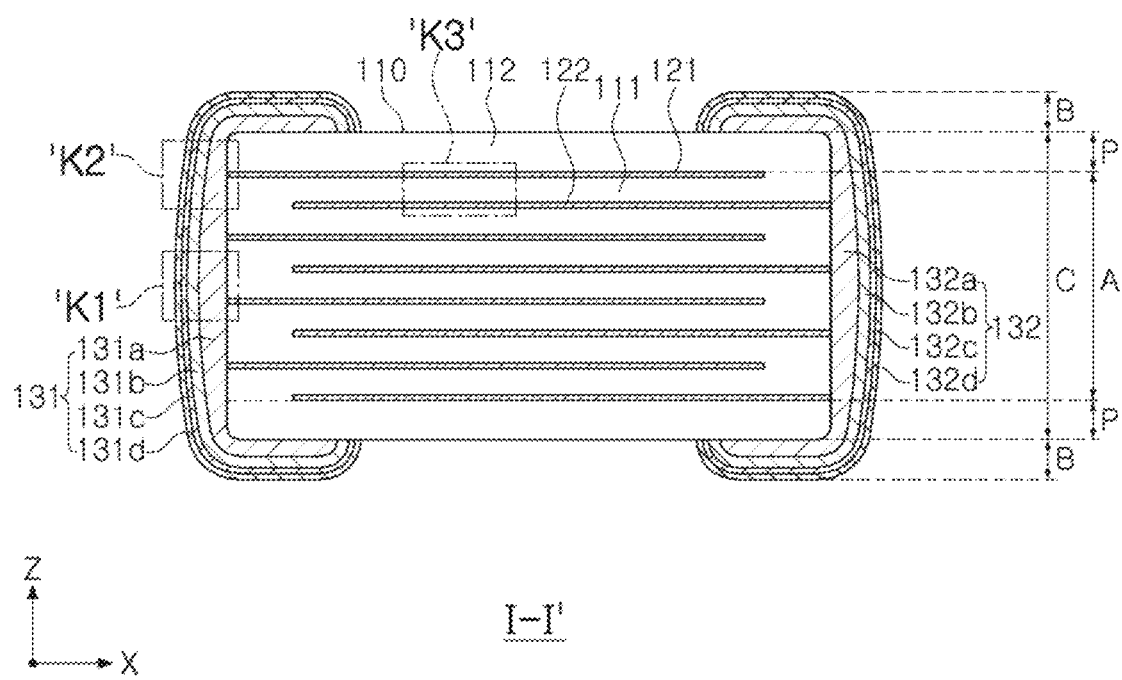
FIG. 3 is a schematic cross-sectional view taken along line I-I' of FIG. 1.

FIG. 3 is a schematic cross-sectional view taken along line I-I' of FIG. 1.

FIG. 4(a) illustrates a ceramic green sheet on which a first internal electrode is printed, and FIG. 4(b) illustrates a ceramic green sheet on which a second internal electrode is printed.

Referring to FIGS. 1 through 4, a ceramic electronic component 100 according to an exemplary embodiment in the present disclosure includes a body 110 including a capacitance formation portion A including a dielectric layer 111 and a plurality of internal electrodes 121 and 122 disposed to face each other with the dielectric layer interposed therebetween and forming capacitance and protective portions P disposed on upper and lower surfaces of the capacitance formation portion A and external electrodes 131 and 132 disposed on the body 110 and including electrode layers 131a and 132a disposed on the body and connected to the plurality of internal electrodes 121 and 122 and conductive resin layers 131b and 132b respectively disposed on the electrode layers 131a and 132a, wherein ta2/ta1 is 0.05 or greater, where ta1 is a thickness of each of the electrode layers at a central portion of the capacitance formation portion and ta2 is a thickness of each of the electrode layers at a boundary between the capacitance formation portion and the protective portion.

Hereinafter, a ceramic electronic component according to an exemplary embodiment in the present disclosure will be described, but the present disclosure is not limited thereto.

In the body 110, the dielectric layer 111 and the internal electrodes 121 and 122 are alternately stacked.

A specific shape of the body 110 is not limited, but, as illustrated, the body 110 may have a hexahedral shape or a similar shape. Due to shrinkage of ceramic powder contained in the body 110 during sintering, the body 110 may not have a hexahedral shape with a perfect straight line but a substantially hexahedral shape.

The body 110 may have first and second surfaces 1 and 2 opposing each other in the thickness direction (Z direction), third and fourth surfaces 3 and 4 connected to the first and second surfaces 1 and 2 and opposing each other in the length direction (X direction), and fifth and sixth surfaces 5 and 6 connected to the first and second surfaces 1 and 2, connected to the third and fourth surfaces 3 and 4, and opposing each other in the width direction (Y direction).

Referring to FIG. 2, a distance between the first surface 1 and the second surface 2 may be defined as a thickness T of the body, a distance between the third surface 3 and the fourth surface 4 may be defined as a length L of the body, and a distance between the fifth surface 5 and the sixth surface 6 may be defined as a width W of the body.

A plurality of dielectric layers 111 constituting the ceramic body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layers 111 is not particularly limited as long as sufficient electrostatic capacity can be obtained. For example, a barium titanate-based material, a lead composite perovskite-based material, a strontium titanate-based material, and the like, may be used.

The dielectric layer 111 may be formed by adding various ceramic additives, organic solvents, plasticizers, binders, dispersants, and the like, to powder such as barium titanate ($BaTiO_3$), and the like, according to the purpose of the present disclosure.

The plurality of internal electrodes 121 and 122 are disposed to face each other with the dielectric layer 111 interposed therebetween.

The internal electrodes may include first and second internal electrodes 121 and 122 arranged alternately to face each other with the dielectric layer interposed therebetween.

The first and second internal electrodes 121 and 122 may be exposed to the third and fourth surfaces 3 and 4 of the body 110, respectively.

Referring to FIGS. 1 through 3, the first internal electrode 121 is spaced apart from the fourth surface 4 and exposed to the third surface 3, and the second internal electrode 122 is spaced apart from the third surface 3 and exposed to the fourth surface 4. The first external electrode 131 is disposed on the third surface 3 of the body and connected to the first internal electrode 121 and the second external electrode 132 is disposed on the fourth surface 4 of the body and connected to the second internal electrode 122.

Figure 4:
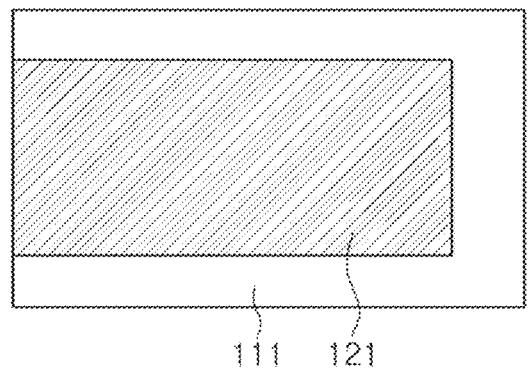
FIG. 4($a$) illustrates a ceramic green sheet on which a first internal electrode is printed, and FIG. 4($b$) illustrates a ceramic green sheet on which a second internal electrode is printed.
Figure 4:
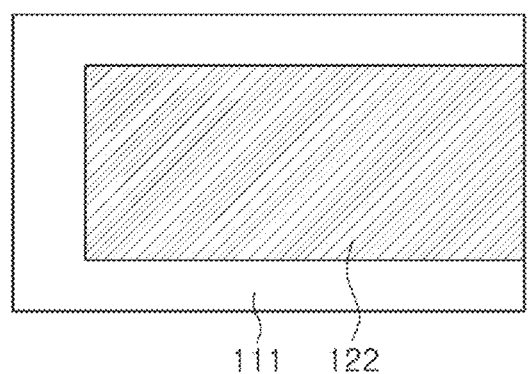

Here, the first and second internal electrodes 121 and 122 may be electrically separated from each other by the dielectric layer 111 disposed therebetween. Referring to FIG. 4, the body 110 may be formed by alternately stacking a ceramic green sheet (a) on which the first internal electrode 121 is printed and a ceramic green sheet (b) on which the second internal electrode 122 is printed in the thickness direction (Z direction) and subsequently sintering the same.

A material for forming the first and second internal electrodes 121 and 122 is not limited and the first and second internal electrodes 121 and 122 may be formed of a conductive paste including one or more materials among precious metals such as palladium (Pd), a palladium-silver (Pd—Ag) alloy, and the like, nickel (Ni), and copper (Cu).

A screen printing method, a gravure printing method, or the like, may be used for printing the conductive paste but the present disclosure is not limited thereto.

The ceramic electronic component 100 according to an exemplary embodiment in the present disclosure includes the capacitance formation portion A including the first internal electrode 121 and the second internal electrode 122 disposed inside the body 110 and disposed to face each other with the dielectric layer 111 interposed therebetween and the protective portions P formed on the upper and lower surfaces of the capacitance formation portion A.

The protective portions P do not include the internal electrodes 121 and 122 and may include the same material as that of the dielectric layer 111. That is, the protective portions P may include a ceramic material and may include, for example, a barium titanate-based material, a lead composite perovskite-based material, a strontium titanate-based material, and the like.

The protective portions P may be formed by stacking a single dielectric layer 112 or two or more dielectric layers 112 on each of the upper and lower surfaces of the capacitance formation portion A in a vertical direction and serve to prevent damage to the internal electrodes due to physical or chemical stress.

The external electrodes 131 and 132 include the electrode layers 131a and 132a disposed on the body 110 and connected to the plurality of internal electrodes 121 and 122 and the conductive resin layers 131b and 132b respectively disposed on the electrode layers 131a and 132a.

The external electrodes 131 and 132 may further include Ni plating layers 131c and 132c respectively formed on the conductive resin layers 131b and 132b and Sn plating layers 131d and 132d respectively formed on the Ni plating layers 131c and 132c.

The first external electrode 131 is disposed on the third surface 3 of the body and a second external electrode 132 is disposed on the fourth surface 4 of the body.

The first external electrode 131 includes a first electrode layer 131a connected to the first internal electrode 121 and a first conductive resin layer 131b disposed on the first electrode layer 131a.

The second external electrode 132 includes a second electrode layer 132a connected to the second internal electrode 122 and a second conductive resin layer 132b disposed on the second electrode layer 132a.

The first external electrode 131 may further include a first Ni plating layer 131c disposed on the first conductive resin layer 131b and a first Sn plating layer 131d disposed on the first Ni plating layer 131c.

The second external electrode 132 may further include a second Ni plating layer 132c disposed on the second conductive resin layer 132b and a second Sn plating layer 132d disposed on the second Ni plating layer 132c.

The first and second external electrodes 131 and 132 may be electrically connected to the first and second internal electrodes 121 and 122, respectively, to form capacitance, and the second external electrode 132 may be connected to an electric potential different from that of the first external electrode 131.

Hereinafter, the first external electrode 131 will be mainly described but descriptions of the first external electrode 131 may also be equally applied to the second external electrode 132.

Figure 5:
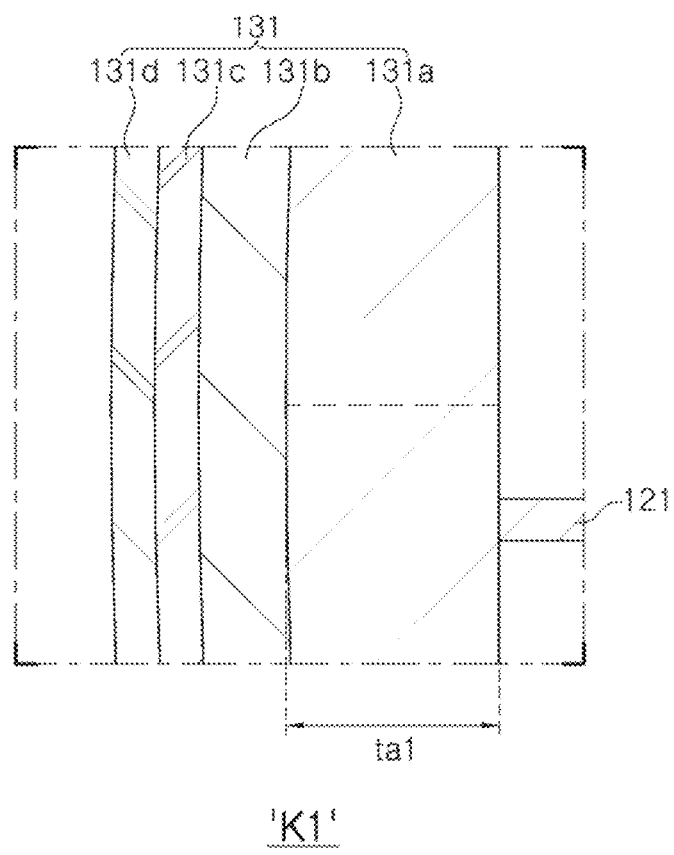
FIG. 5 is an enlarged view of a region K1 of FIG. 3.
Figure 6:
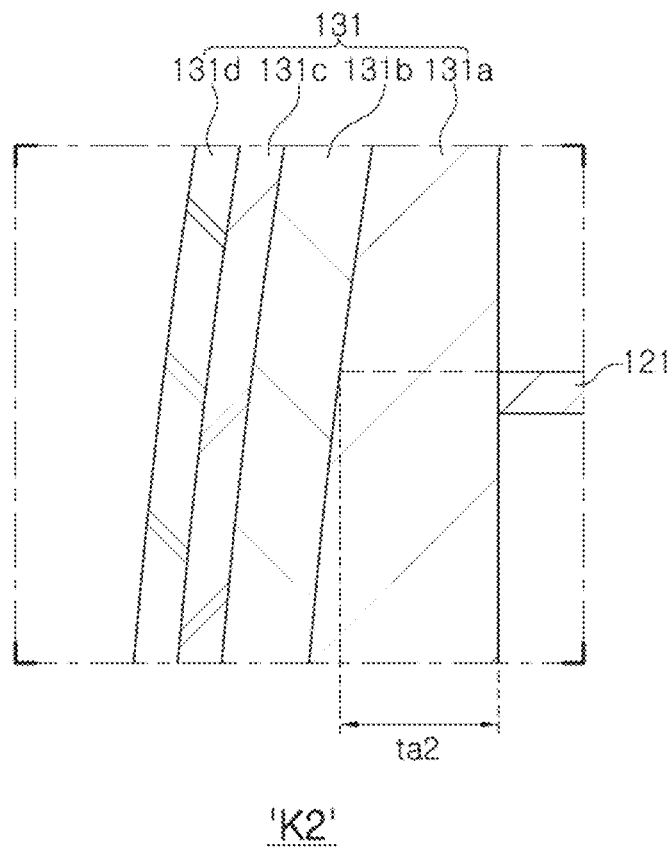
FIG. 6 is an enlarged view of a region K2 of FIG. 3.

FIG. 5 is an enlarged view of a region K1 of FIG. 3.
FIG. 6 is an enlarged view of a region K2 of FIG. 3.

Referring to FIGS. 5 and 6, in the ceramic electronic component according to an exemplary embodiment in the present disclosure, ta2/ta1 is 0.05 or greater, where ta1 is a thickness of the electrode layer 131a at a central portion of the capacitance formation portion A and ta2 is a thickness of the electrode layer 131a at a boundary between the capacitance formation portion A and the protective portion B. The ta1 and ta2 may be measured by scanning images of cross-sections in length and thickness directions cut at a central portion of the body 110 in the width direction by a scanning electron microscope (SEM) and measured in the same unit to describe the ratio (ta2/ta1).

In order to form external electrodes of a multilayer ceramic capacitor (MLCC), a method of dipping an exposed surface of a capacitor body to which internal electrodes are exposed, into paste containing a conductive metal is mainly used.

However, corner portions of the external electrodes formed by the dipping method are too thin. This causes a problem that, when a plating layer is formed on the external electrodes to increases connectivity and mountability of the MLCC, a plating solution penetrates to the inside of the capacitor body to reduce reliability of the MLCC. In addition, a movement path of current is reduced to increase a risk of equivalent series resistance (ESR) failure.

However, according to an exemplary embodiment in the present disclosure, when the external electrodes 131 and 132 include the electrode layers 131a and 132a and the conductive resin layers 131b and 132b and ta2/ta1 is 0.05 or greater, although the external electrodes 131 and 132 are formed by the dipping method, excellent moisture resistance reliability may be ensured and ESR failure may be improved.

The conductive resin layers 131b and 132b serve to electrically and mechanically bond the sintered electrode layers and plating layers of the MLCC and serve to protect the MLCC from mechanical and thermal stress according to process temperatures during mounting of a circuit board and bending impact of the board.

Further, the conductive resin layers 131b and 132b absorb tensile stress generated in a mechanical or thermal environment to prevent cracks caused by stress to thus suppress formation of a moisture penetration path and lengthen a path for moisture or a plating solution to penetrate to the inside of the body to improve moisture resistance reliability.

Thus, a sufficient moisture resistance reliability improvement effect and an ESR failure improvement effect may be obtained, except for the case where ta2/ta1 is less than 0.05.

The electrode layers 131a and 132a may include a conductive metal and glass.

The conductive metal used for the electrode layers 131a and 132a is not limited as long as it is a material that may be electrically connected to the internal electrodes for forming capacitance. For example, the conductive metal may be one or more selected from the group consisting of copper (Cu), silver (Ag), Nickel (Ni), and alloys thereof.

The electrode layers 131a and 132a may be formed by applying a conductive paste prepared by adding a glass frit to the conductive metal powder and subsequently sintering the conductive paste.

The conductive resin layers 131b and 132b may be formed on the electrode layers 131a and 132a and completely cover the electrode layers 131a and 132a, respectively.

The conductive resin layers 131b and 132b may include a conductive metal and a base resin.

The base resin included in the conductive resin layers 131b and 132b is not limited as long as it has bonding and impact absorbing properties and may be mixed with the conductive metal powder to form a paste. For example, the base resin may include an epoxy-based resin.

The conductive metal included in the conductive resin layers 131b and 132b is not limited as long as it is a material that may be electrically connected to the electrode layers 131a and 132a. For example, the conductive metal may include one or more selected from the group consisting of copper (Cu), silver (Ag), nickel (Ni), and alloys thereof.

The Ni plating layers 131c and 132c may be formed on the conductive resin layers 131b and 132b and completely cover the conductive resin layers 131b and 132b, respectively.

The Sn plating layers 131d and 132d may be formed on the Ni plating layers 131c and 132c and completely cover the Ni plating layers 131c and 132c, respectively.

The Ni plating layers 131c and 132c and the Sn plating layers 131d and 132d serve to improve connectivity and mountability.

The thickness of the Ni plating layers 131c and 132c may range from 0.5 µm to 7 µm.

If the thickness of the Ni plating layers 131c and 132c is less than 0.5 µm, it may be difficult to ensure solderability. If the thickness exceeds 7 µm, frequency of bending cracks due to plating stress may increase to degrade bending strength characteristics.

The thickness of the Sn plating layers 131d and 132d may range from 0.5 µm to 12 µm.

If the thickness of the Sn plating layers 131d and 132d is less than 0.5 µm, it may be difficult to ensure solderability. If the thickness exceeds 12 µm, frequency of bending cracks due to plating stress may increase to degrade bending strength characteristics.

The external electrodes 131 and 132 may include a connection portion C disposed on the third surface 3 or the fourth surface 4 of the body and band portions B extending from the connection portion C to portions of the first and second surfaces 1 and 2.

Here, the band portions B may extend from the connection portion C even to portions of the fifth and sixth surfaces 5 and 6, as well as to the portions of the first and second surfaces 1 and 2.

Figure 7:
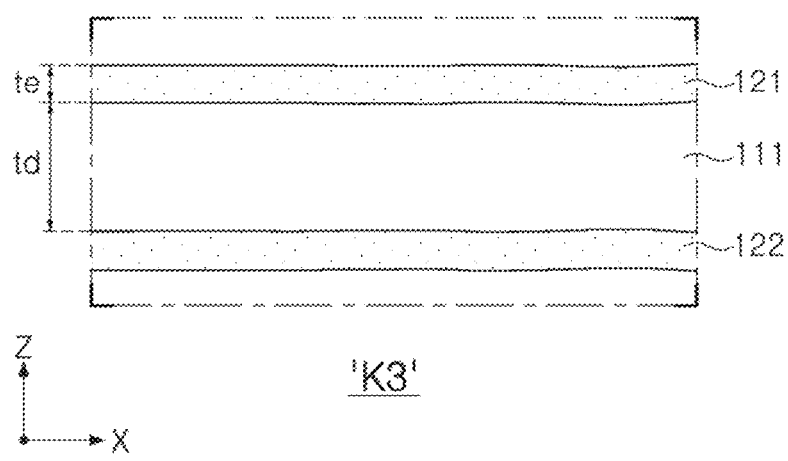
FIG. 7 is an enlarged view of a region K3 of FIG. 3.

FIG. 7 is an enlarged view of a region K3 of FIG. 3.

Referring to FIG. 7, in the ceramic electronic component according to an exemplary embodiment in the present disclosure, a thickness td of the dielectric layer 111 and a thickness te of the internal electrodes 121 and 122 may satisfy td>2*te.

That is, according to an exemplary embodiment in the present disclosure, the thickness td of the dielectric layer 111 is larger than twice the thickness te of the internal electrodes 121 and 122.

Generally, a main issue of an electronic component to be used in a high voltage electric device is reliability according to lowering of a dielectric breakdown voltage in a high voltage environment.

In the MLCC according to an exemplary embodiment in the present disclosure, in order to prevent the dielectric breakdown voltage from lowering in a high voltage environment, the thickness td of the dielectric layer 111 is greater than twice the thickness te of the internal electrodes 121 and 122 to thus increase the thickness of the dielectric layer as a distance between the internal electrodes, thereby improving the breakdown voltage characteristics.

If the thickness td of the dielectric layer 111 is smaller than twice the thickness te of the internal electrodes 121 and 122, the thickness of the dielectric layer, which is the distance between internal electrodes, is so thin that the dielectric breakdown voltage may be degraded.

The thickness te of the internal electrodes may be less than 1 µm and the thickness td of the dielectric layer may be less than 2.8 µm, but the present disclosure is not limited thereto.

When a distance between the third surface 3 and the fourth surface 4 of the body 110 is L and a distance between the fifth surface 5 and the sixth surface 6 of the body 110 is W, L may be 3.2 mm or less and W may be 2.5 mm or less, and, more preferably, L may be 2.0 mm or less and W may be 1.2 mm or less.

For example, the ceramic electronic component may6 have a size of 3225 (3.2 mm×2.5 mm), 3216 (3.2 mm×1.6 mm), 2012 (2.0 mm×1.2 mm), 1608 (1.6 mm×0.8 mm), or the like.

Table 1 shows moisture resistance reliability evaluated according to ta2/ta1, the length L of the body, and the width W of the body.

Here, ta1 is the thickness of the electrode layer at the central portion of the capacitance formation portion A and ta2 is the thickness of the electrode layer at the boundary between the capacitance formation portion A and the protective portion P.

ta1 and ta2 of the body 110 were measured by scanning images of cross-sections in length and thickness directions cut at a central portion of the body 110 in the width direction by a scanning electron microscope (SEM) and measured in the same unit to describe the ratio (ta2/ta1).

Regarding moisture resistance reliability, 400 samples per sample number were prepared and tested by applying a voltage 1.5 times a reference voltage in an environment in which a temperature was 85° C. and relative humidity was 85%, and samples whose insulation resistance values were degraded by 1-order or greater, compared with that before the test started were determined to be defective, and the number of defective samples are shown.

TABLE 1

| Sample No. | ta2/ta1 | L (mm) | W (mm) | Moisture resistance reliability |
|---|---|---|---|---|
| 1 | 0.02 | 1.6 | 0.8 | 1/400 |
| 2 | 0.04 | | | 1/400 |
| 3 | 0.06 | | | 0/400 |
| 4 | 0.08 | | | 0/400 |
| 5 | 0.1 | | | 0/400 |
| 6 | 0.02 | 2.0 | 1.2 | 2/400 |
| 7 | 0.04 | | | 1/400 |
| 8 | 0.06 | | | 0/400 |
| 9 | 0.08 | | | 0/400 |
| 10 | 0.1 | | | 0/400 |
| 11 | 0.02 | 3.2 | 1.6 | 2/400 |
| 12 | 0.04 | | | 0/400 |
| 13 | 0.06 | | | 0/400 |
| 14 | 0.08 | | | 0/400 |
| 15 | 0.1 | | | 0/400 |
| 16 | 0.02 | 3.2 | 2.5 | 2/400 |
| 17 | 0.04 | | | 1/400 |
| 18 | 0.06 | | | 0/400 |
| 19 | 0.08 | | | 0/400 |
| 20 | 0.1 | | | 0/400 |

Referring to Table 1, it can be seen that sample Nos. 1, 2, 6, 7, 11, 16, and 17 having ta2/ta1 less than 0.05 have poor moisture resistance reliability.

Meanwhile, it can be seen that samples having ta2/ta1 of 0.05 or greater are excellent in moisture resistance reliability.

As set forth above, according to exemplary embodiments in the present disclosure, moisture resistance reliability may be enhanced by adjusting the ratio of the thickness of the electrode layer at the central portion of the capacitance formation portion and the thickness of the electrode layer at the boundary between the capacitance formation portion and the protective portion.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
a body including a capacitance formation portion including a dielectric layer and a plurality of internal electrodes disposed to face each other with the dielectric layer interposed therebetween and forming capacitance and protective portions disposed on upper and lower surfaces of the capacitance formation portion, the internal electrodes being exposed through side surfaces of the body; and
external electrodes including electrode layers respectively disposed on the side surfaces of the body and conductive resin layers respectively disposed on the electrode layers, the electrode layers being connected to the plurality of internal electrodes, wherein ta2/ta1 is in a range from 0.05 to 0.1,
where ta1 is a thickness of each of the electrode layers at a central portion of the capacitance formation portion and ta2 is a thickness of each of the electrode layers at a boundary between the capacitance formation portion and the protective portion,
wherein each of the electrode layers extends at least onto the upper and lower surfaces of the body and comprises conductive metal and glass, and
wherein a length of the body is 1.6 mm or more and a width of the body is 0.8 mm or more.

2. The ceramic electronic component of claim 1, wherein a thickness of each of the internal electrodes is 1 μm or less, and a thickness of the dielectric layer is less than 2.8 μm.

3. The ceramic electronic component of claim 1, wherein td>2*te in which a thickness of each of the internal electrodes is te and a thickness of the dielectric layer is td.

4. The ceramic electronic component of claim 1, wherein each of the conductive resin layers includes one or more conductive metals selected from the group consisting of copper (Cu), silver (Au), nickel (Ni), alloys thereof, and a base resin.

5. The ceramic electronic component of claim 1, wherein each of the external electrodes further includes an Ni plating layer formed on the conductive resin layer and an Sn plating layer formed on the Ni plating layer.

6. The ceramic electronic component of claim 1, wherein the body includes third and fourth surfaces connected to the upper and lower surfaces and opposing each other, and fifth and sixth surfaces connected to the upper, lower, third and fourth surfaces, and opposing each other,
the internal electrodes include a first internal electrode spaced apart from the fourth surface and exposed to the third surface and a second internal electrode spaced apart from the third surface and exposed to the fourth surface, and
the external electrodes include first and second external electrodes respectively connected to the first and second internal electrodes.

7. The ceramic electronic component of claim 6, wherein L is 3.2 mm or less and W is 2.5 mm or less in which a distance between the third surface and the fourth surface of the body is L and a distance between the fifth surface and the sixth surface of the body is W.

8. The ceramic electronic component of claim 6, wherein L is 2.0 mm or less and W is 1.2 mm or less in which a distance between the third surface and the fourth surface of the body is L and a distance between the fifth surface and the sixth surface of the body is W.

9. A ceramic electronic component comprising:
a body comprising a capacitance formation portion, an upper protective portion and a lower protective portion, the capacitance formation portion comprising first internal electrodes and second internal electrodes stacked alternately in a thickness direction, exposed through side surfaces of the body, and separated by dielectric layers interposed therebetween, the upper protective portion being disposed in a length-width plane above a topmost of the first and second internal electrodes, and the lower protective portion being disposed in the length-width plane below a bottommost of the first and second internal electrodes;
a first external electrode disposed in a width-thickness plane to be in contact with the first internal electrodes; and
a second external electrode disposed in the width-thickness to be in contact with the second internal electrodes,
wherein the first and second external electrodes each include an electrode layer satisfying 0.1≥ta2/ta1≥0.05, where ta1 is a thickness of the electrode layer at a central portion of the capacitance formation portion and ta2 is a thickness of the electrode layer at a boundary between the capacitance portion and either of the upper or lower protective portions,
wherein each of the electrode layers extends at least onto upper and lower surfaces of the body and comprises conductive metal and glass, and
wherein a length of the body is 1.6 mm or more and a width of the body is 0.8 mm or more.

10. The ceramic electronic component of claim 9, wherein the body has first and second surfaces in the length-width plane opposing each other in the thickness direction, third and fourth surfaces in the width-thickness plane opposing each other in a length direction, and fifth and sixth surfaces in the length-thickness plane opposing each other in a width direction, the first and second external electrodes being disposed respectively on the third and fourth surfaces.

11. The ceramic electronic component of claim 9, wherein the first and second external electrodes each further include a conductive resin layer disposed on the electrode layer, and a plating layer disposed on the conductive resin layer.

12. The ceramic electronic component of claim 11, wherein the plating layer comprises a first plating layer comprising nickel disposed on the conductive resin layer and a second plating layer comprising tin disposed on the first plating layer.

* * * * *